US012729276B2

(12) United States Patent
Lee et al.

(10) Patent No.: US 12,729,276 B2
(45) Date of Patent: Sep. 8, 2026

(54) METHOD OF PREPARING SUPERABSORBENT POLYMER

(71) Applicant: LG Chem, Ltd., Seoul (KR)

(72) Inventors: Junwye Lee, Daejeon (KR); Chang Hun Han, Daejeon (KR); Tae Young Won, Daejeon (KR); Jungmin Sohn, Daejeon (KR); Hyemin Lee, Daejeon (KR); Jihye Ryu, Daejeon (KR); Minsu Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 857 days.

(21) Appl. No.: 17/796,055

(22) PCT Filed: Aug. 17, 2021

(86) PCT No.: PCT/KR2021/010870

§ 371 (c)(1),
(2) Date: Jul. 28, 2022

(87) PCT Pub. No.: WO2022/080641

PCT Pub. Date: Apr. 21, 2022

(65) Prior Publication Data

US 2023/0119016 A1 Apr. 20, 2023

(30) Foreign Application Priority Data

Oct. 16, 2020 (KR) ........................ 10-2020-0134425

(51) Int. Cl.
*C08J 3/075* (2006.01)
*C08J 3/12* (2006.01)
*C08J 3/24* (2006.01)

(52) U.S. Cl.
CPC ................. *C08J 3/075* (2013.01); *C08J 3/12* (2013.01); *C08J 3/245* (2013.01); *C08J 2323/04* (2013.01)

(58) Field of Classification Search
CPC .................................... C08J 3/075; C08J 3/12
See application file for complete search history.

(56) References Cited

U.S. PATENT DOCUMENTS

2001/0038831 A1 11/2001 Park et al.
2007/0207924 A1 9/2007 Keuchi et al.
2009/0305884 A1 12/2009 Sakamoto et al.
2012/0157644 A1 6/2012 Fujino et al.
2012/0258851 A1 10/2012 Nakatsuru et al.
2013/0026412 A1 1/2013 Machida et al.
2016/0207226 A1 7/2016 Torii et al.
2016/0332141 A1 11/2016 Machida et al.
2017/0009026 A1 1/2017 Nam et al.
2017/0050170 A1 2/2017 Braun et al.
2019/0217272 A1 7/2019 Hong et al.
2019/0308171 A1 * 10/2019 Kim ........................ C08J 3/245
2019/0344243 A1 11/2019 Lee et al.
2020/0164344 A1 5/2020 Kim et al.
2020/0368722 A1 11/2020 Kim et al.
2021/0269606 A1 9/2021 Wakabayashi et al.
2021/0309777 A1 10/2021 Lee et al.

FOREIGN PATENT DOCUMENTS

CN 108779265 A 11/2018
CN 109415516 A 3/2019
CN 110167997 A 8/2019
EP 2557095 A1 2/2013
EP 3070114 A1 9/2016
EP 3406655 A1 11/2018
EP 3719059 A1 10/2020
JP 2000063527 A 2/2000
JP 2005272653 A * 10/2005
JP 2007077393 A 3/2007
JP 2007529295 A 10/2007
JP 5442204 B2 3/2014
JP 2014-098172 A 5/2014
JP 2019518821 A 7/2019
JP 2021-518874 A 8/2021
KR 20070007162 A 1/2007

(Continued)

OTHER PUBLICATIONS

Machine Translation of JP2005-272653A. Oct. 6, 2005. (Year: 2005).*
Extended European Search Report for Application No. 21880290.8 mailed Jun. 20, 23. 11 pgs.
International Search Report for PCT/KR2021/010870 dated Nov. 30, 2021. 4 pgs.
Odian, George, "Principles of polymerization", 2nd ed., Wiley-Interscience New York, Oct. 1981.3 pgs.

(Continued)

*Primary Examiner* — Stephen E Rieth
(74) *Attorney, Agent, or Firm* — Lerner David LLP

(57) ABSTRACT

Provided is a method for preparing a superabsorbent polymer to minimize surface damage to the polymer while maintaining absorption performance. Such method comprises steps of carrying out a crosslinking polymerization of a water-soluble ethylene-based unsaturated monomer having acidic groups which are at least partially neutralized, in the presence of a foaming agent, to form a water-containing gel polymer; and gel-pulverizing the water-containing gel polymer by extruding the water-containing gel polymer through a perforated panel having a plurality of holes using a screw extruder mounted inside a cylindrical pulverizer under a condition that a chopping index according to the following Equation 1 is 55 to 75:

$$\text{Chopping index} = \frac{2\pi \times N}{60} \times \frac{1}{A} \times \frac{11}{R} \quad \text{[Equation 1]}$$

wherein in Equation 1, all the variables are described herein.

4 Claims, 1 Drawing Sheet

(56) References Cited

FOREIGN PATENT DOCUMENTS

| | | | |
|---|---|---|---|
| KR | 20160048842 | A | 5/2016 |
| KR | 20160137499 | A | 11/2016 |
| KR | 20170005461 | A | 1/2017 |
| KR | 20190072298 | A | 6/2019 |
| KR | 20200068376 | A | 6/2020 |
| WO | 2005097313 | A1 | 10/2005 |
| WO | 2011025013 | A1 | 3/2011 |
| WO | 2011126079 | A1 | 10/2011 |
| WO | 2019221154 | A1 | 11/2019 |
| WO | 2020-189539 | A1 | 9/2020 |

OTHER PUBLICATIONS

Schwalm, Reinhold, "UV Coatings: Basics, Recent Developments and New Applications", Elsevier Science (Dec. 2006). 3 pgs.

Search Report dated Feb. 2, 2024 from the Office Action for Chinese Application No. 202180007393.7 issued Feb. 19, 2024, 3 pages.

* cited by examiner

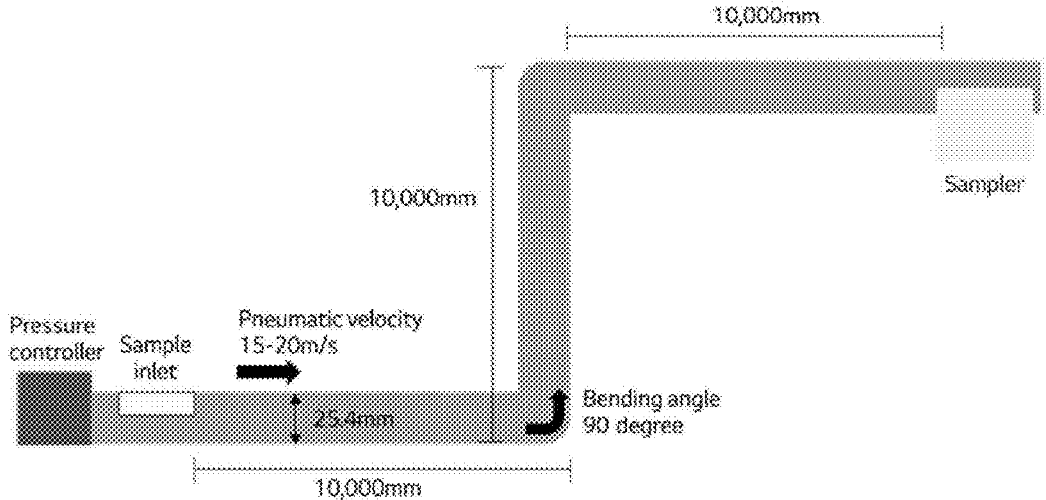
10,000mm
10,000mm
Sampler
Pressure
controller
Sample
inlet
Pneumatic velocity
15-20m/s
25.4mm
Bending angle
90 degree
10,000mm

METHOD OF PREPARING SUPERABSORBENT POLYMER

CROSS-REFERENCE TO RELATED APPLICATIONS

The present application is a national phase entry under 35 U.S.C. § 371 of International Application No. PCT/KR2021/010870, filed on Aug. 17, 2021, which claims priority to Korean Patent Application No. 10-2020-0134425, filed on Oct. 16, 2020, the disclosures of which are hereby incorporated by reference herein in their entirety.

TECHNICAL FIELD

The present technology relates to a method of preparing a superabsorbent polymer, which enables preparation of the superabsorbent polymer exhibiting an improved absorption rate while maintaining excellent absorption performances.

BACKGROUND ART

A superabsorbent polymer (SAP) is a synthetic polymeric material capable of absorbing moisture from about 500 to 1000 times its own weight, and also called SAM (Super Absorbency Material), AGM (Absorbent Gel Material), etc.

Since superabsorbent polymers started to be practically applied in sanitary products, now they have been widely used not only for hygiene products such as disposable diapers for children, etc., but also for water retaining soil products for gardening, water stop materials for the civil engineering and construction, sheets for raising seedling, fresh-keeping agents for food distribution fields or the like. In most cases, these superabsorbent polymers have been widely used in the field of hygienic materials such as diapers, sanitary pads, etc. For these applications, superabsorbent polymers are required to exhibit high absorbency with respect to water, etc., not to release the absorbed water even under an external pressure, and also to well maintain their shape even in a state where the volume is expanded (swelled) by absorbing water, thereby exhibiting excellent permeability.

Recently, with increasing demand for thin diapers, a proportion of the superabsorbent polymer tends to relatively increase in the diapers. Therefore, the superabsorbent polymer needs to have the performance of the fibrous materials in the diapers. To this end, superabsorbent polymers should have a high absorption rate and permeability as well as high absorbency.

For example, as a method of improving the absorption rate of superabsorbent polymers, a method of introducing a porous structure into the superabsorbent polymer through foaming polymerization has been widely known. However, when the porous structure is introduced by this method, a sufficient crosslinked structure is not introduced inside the superabsorbent polymer, resulting in a decrease in permeability or absorbency under pressure. Furthermore, the basic absorption performances of the superabsorbent polymer may be deteriorated due to excessive occurrence of foaming polymerization, etc.

On the other hand, in the preparation of the superabsorbent polymers, a pneumatic conveying process is necessarily performed in the preparation process. This pneumatic conveying is carried out through high-pressure gas, and the superabsorbent polymer collides with the inner wall of a conveying line during or after passing through a bent section of the conveying line, thereby causing surface damage, leading to a deterioration in physical properties of the superabsorbent polymer.

For this reason, there is a continuous demand for a technology capable of further improving the absorption rate while maintaining excellent absorption performances of the superabsorbent polymer by overcoming the trade-off relationship of the physical properties, in particular, a method capable of minimizing the surface damage phenomenon of the superabsorbent polymer during the pneumatic conveying process.

DISCLOSURE

Technical Problem

Accordingly, there is provided a method of preparing a superabsorbent polymer, which enables preparation of the superabsorbent polymer exhibiting an improved absorption rate while maintaining excellent absorption performances by minimizing a surface damage phenomenon of the superabsorbent polymer in a pneumatic conveying process during the preparation process of the superabsorbent polymer or in a pneumatic conveying process of the finally prepared superabsorbent polymer.

Technical Solution

To achieve the above object, there is provided a method of preparing a superabsorbent polymer, the method including the following steps of:

1) carrying out a crosslinking polymerization of a water-soluble ethylene-based unsaturated monomer having acidic groups which are at least partially neutralized, in the presence of a foaming agent, to form a water-containing gel polymer (step 1);
2) gel-pulverizing the water-containing gel polymer (step 2);
3) drying, pulverizing, and size-sorting the gel-pulverized water-containing gel polymer to form a base polymer powder (step 3); and
4) carrying out a surface crosslinking of the base polymer powder by heat treatment in the presence of a surface crosslinking agent (step 4), wherein the gel-pulverizing step is carried out by extruding the water-containing gel polymer through a perforated panel having a plurality of holes using a screw extruder mounted inside a cylindrical pulverizer under the condition that a chopping index according to the following Equation 1 is 55 to 75:

$$\text{Chopping index} = \frac{2\pi \times N}{60} \times \frac{1}{A} \times \frac{11}{R} \quad \text{[Equation 1]}$$

in Equation 1, wherein N represents the number of rotation (rpm) of a screw in the screw extruder, A represents porosity ($\pi r^2 \times n / \pi R^2$) of the perforated panel, wherein r represents a radius (mm) of the holes formed in the perforated panel, n represents the number of holes formed in the perforated panel, and R represents a radius (mm) of the perforated panel.

In the present technology, when the gel-pulverizing conditions are controlled to meet the chopping index, the absorption rate may be greatly improved while maintaining excellent absorption performances, and in particular, a surface damage phenomenon of the superabsorbent polymer may be minimized in a pneumatic conveying process during the preparation process, which may be confirmed by calculating a "crush resistance index" described below.

Although there is no theoretical limitation, when the above-described chopping index is controlled, the water-containing gel polymer is very uniformly pulverized, and a developed porous structure is introduced inside the superabsorbent polymer, and gel pulverization and introduction of the porous structure uniformly occur, and thus it is expected that the surface damage of the superabsorbent polymer is minimized.

Therefore, according to the method of one embodiment, it is possible to prepare and provide a superabsorbent polymer having a more improved absorption rate while maintaining excellent absorption performances by overcoming the trade-off relationship of physical properties previously known.

Hereinafter, each step of the present technology will be described in detail.

(Step 1)

The step 1 is a step of preparing a water-containing gel polymer, specifically, a step of preparing a water-containing gel polymer by carrying out a crosslinking polymerization of a monomer composition including a water-soluble ethylene-based unsaturated monomer having acidic groups which are at least partially neutralized, in the presence of a foaming agent.

The water-soluble ethylene-based unsaturated monomer may be any monomer commonly used in the preparation of superabsorbent polymers. Specifically, the water-soluble ethylene-based unsaturated monomer may be a compound represented by the following Chemical Formula 1:

[Chemical Formula1]

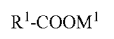

in Chemical Formula 1, $R^1$ is an alkyl group containing an unsaturated bond and having 2 to 5 carbon atoms, and $M^1$ is a hydrogen atom, a monovalent or divalent metal, an ammonium group, or an organic amine salt.

Preferably, the water-soluble ethylene-based unsaturated monomer may include one or more selected from the group consisting of acrylic acid, methacrylic acid, and a monovalent metal salt thereof, a divalent metal salt thereof, an ammonium salt thereof, and an organic amine salt thereof. As described, when acrylic acid or a salt thereof is used as the water-soluble ethylene-based unsaturated monomer, it is advantageous in terms of obtaining a superabsorbent polymer having improved absorbency. In addition, the monomer may include one or more selected from the group consisting of an anionic monomer such as maleic anhydride, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamide-2-methylpropane sulfonic acid, and a salt thereof; a nonionic hydrophilic monomer such as (meth)acrylamide, N-substituted (meth) acrylate, 2-hydroxyethyl(meth)acrylate, 2-hydroxypropyl (meth)acrylate, methoxypolyethyleneglycol(meth)acrylate, or polyethyleneglycol(meth)acrylate; and an unsaturated monomer containing an amino group such as (N,N)-dimethylaminoethyl(meth)acrylate or (N,N)-dimethylaminopropyl(meth)acrylamide, and a quaternary compound thereof.

The water-soluble ethylene-based unsaturated monomer may have an acidic group, in which at least a part of the acidic group is neutralized. Preferably, those partially neutralized with an alkaline substance such as sodium hydroxide, potassium hydroxide, ammonium hydroxide or the like may be used as the monomer.

In this regard, the degree of neutralization of the monomer may be 40 mol % to 95 mol %, or 40 mol % to 80 mol %, or 45 mol % to 75 mol %. The range of the degree of neutralization may vary depending on the final physical properties. An excessively high degree of neutralization causes the neutralized monomers to be precipitated, and thus polymerization may not readily occur. On the contrary, an excessively low degree of neutralization not only deteriorates the absorbency of the polymer but also endows the polymer with hard-to-handle properties, like elastic rubber.

The monomer composition may include a polymerization initiator commonly used in the preparation of superabsorbent polymers.

As the polymerization initiator, a thermal polymerization initiator, a photopolymerization initiator or the like may be used depending on the polymerization method. However, even in the case of the photo-polymerization method, a certain amount of heat is generated by ultraviolet irradiation, etc., and a certain amount of heat is generated in accordance with the progression of the polymerization reaction, which is an exothermic reaction, and therefore, a thermal polymerization initiator may further be included.

The photo-polymerization initiator may include, for example, one or more compounds selected from the group consisting of benzoin ether, dialkyl acetophenone, hydroxyl alkyl ketone, phenyl glyoxylate, benzyl dimethyl ketal, acyl phosphine, and α-aminoketone. Among them, as a specific example of the acylphosphine, a commercially available lucirin TPO, i.e., 2,4,6-trimethyl-benzoyl-trimethyl phosphine oxide may be used. More various photo-polymerization initiators are well disclosed in "UV Coatings: Basics, Recent Developments and New Application (Elsevier, 2007)" written by Reinhold Schwalm, p 115, the content of which is incorporated herein by reference.

As the thermal polymerization initiator, one or more compounds selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate ($(NH_4)_2S_2O_8$), etc. In addition, examples of the azo-based initiator may include 2,2-azobis(2-amidinopropane)dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane] dihydrochloride, 4,4-azobis-(4-cyanovaleric acid), etc. More various thermal polymerization initiators are well disclosed in "Principle of Polymerization (Wiley, 1981)" written by Odian, p 203, the content of which is incorporated herein by reference.

The polymerization initiator may be included at a concentration of about 0.001% by weight to about 1% by weight, or 0.005% by weight to about 0.1% by weight, based on the monomer composition. In other words, when the concentration of the polymerization initiator is too low, the polymerization rate may become slow and a large amount of residual monomer may be extracted in the final product, which is not preferred. On the contrary, when the concentration of the polymerization initiator is too high, polymer chains constituting the network become short, and thus the content of water-soluble components is increased and physical properties of the polymer may deteriorate such as a reduction in absorbency under pressure.

Meanwhile, the polymerization of the monomer composition may be carried out in the presence of a crosslinking agent ("internal crosslinking agent") in order to improve physical properties of the polymer by polymerization of the water-soluble ethylene-based unsaturated monomer. The crosslinking agent is used for internal crosslinking of the water-containing gel polymer, and is used, separately from "a surface crosslinking agent" described below.

The internal crosslinking agent may be any compound, as long as it enables introduction of crosslinking during the polymerization of the water-soluble ethylene-based unsaturated monomer. As non-limiting examples of the internal crosslinking agent, multifunctional crosslinking agents such as N,N'-methylenebisacrylamide, trimethylolpropane tri(meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri(meth)acrylate, pentaerythritol tetraacrylate, triallylamine, allyl(meth)acrylate, ethylene glycol diglycidyl ether, propylene glycol, glycerin, or ethylene carbonate may be used alone or in combination of two or more thereof.

The internal crosslinking agent may be added at a concentration of 0.001% by weight to 1% by weight, or 0.01% by weight to 0.8% by weight, or 0.1% by weight to 0.7% by weight, based on the monomer composition. In other words, when the concentration of the internal crosslinking agent is too low, the absorption rate of the polymer is lowered and gel strength may become weak, which is not preferred. On the contrary, when the concentration of the internal crosslinking agent is too high, the absorption capacity of the polymer is lowered, which is not preferred for an absorbent.

In addition, crosslinking polymerization of the monomer composition is carried out in the presence of a foaming agent, depending on the need and degree of improvement of the absorption rate. This foaming agent is decomposed during the crosslinking polymerization reaction to generate gas, and therefore, pores may be formed inside the water-containing gel polymer. As a result, when such a foaming agent is additionally used, a more developed porous structure is formed inside the superabsorbent polymer, and the absorption rate of the superabsorbent polymer may be further improved.

Non-limiting examples of the foaming agent may include one or more compounds selected from the group consisting of sodium bicarbonate, sodium carbonate, potassium bicarbonate, potassium carbonate, calcium bicarbonate, calcium carbonate, magnesium bicarbonate, magnesium carbonate, azodicarbonamide (ADCA), dinitroso pentamethylene tetramine (DPT), p,p'-oxybis(benzenesulfonyl hydrazide) (OBSH), p-toluenesulfonyl hydrazide (TSH), sucrose stearate, sucrose palmitate, and sucrose laurate.

The foaming agent may be preferably present in an amount of 1000 ppmw to 4000 ppmw, and more specifically, in an amount of 1000 ppm or more, or 1100 ppmw or more, or 1200 ppmw or more; and 4000 ppmw or less, or 3500 ppmw or less, or 3000 ppmw or less in the monomer composition.

In addition, the monomer composition may further include additives such as a thickener, a plasticizer, a preservation stabilizer, an antioxidant, etc., as needed.

Such monomer composition may be prepared in the form of a solution in which raw materials, such as the above-described water-soluble ethylene-based unsaturated monomer, polymerization initiator, internal crosslinking agent, foaming agent, etc., are dissolved in a solvent.

In this regard, as the usable solvent, any solvent may be used without limitations in the constitution as long as it is able to dissolve the above raw materials. For example, as the solvent, water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, or a mixture thereof may be used.

Formation of the water-containing gel polymer through polymerization of the monomer composition may be carried out by a common polymerization method, and a process thereof is not particularly limited.

For non-limiting example, the polymerization method is largely classified into thermal polymerization and photo-polymerization according to a polymerization energy source. The thermal polymerization may be carried out in a reactor like a kneader equipped with agitating spindles. The photo-polymerization may be carried out in a reactor equipped with a movable conveyor belt.

For example, the monomer composition is injected to the reactor like the kneader equipped with the agitating spindles, and thermal polymerization is carried out by providing hot air thereto or by heating the reactor, thereby obtaining the water-containing gel polymer. In this regard, the water-containing gel polymer may have a size of centimeters or millimeters when it is discharged from an outlet of the reactor, according to the type of agitating spindles equipped in the reactor. Specifically, the water-containing gel polymer may be obtained in various forms according to a concentration of the monomer composition fed thereto, a feeding speed or the like, and the water-containing gel polymer having a (weight average) particle size of 2 mm to 50 mm may be generally obtained.

For another example, when the monomer composition is subjected to photo-polymerization in the reactor equipped with the movable conveyor belt, the water-containing gel polymer may be obtained in a sheet-type. In this regard, the thickness of the sheet may vary according to the concentration of the monomer composition fed thereto and the feeding speed. The sheet is preferably controlled to have a thickness of 0.5 cm to 10 cm in order to assure the production speed while allowing the entire sheet to be uniformly polymerized.

The water-containing gel polymer formed by the method may exhibit a water content of 40% by weight to 80% by weight. The water content, as used herein, means a weight occupied by water with respect to the total weight of the water-containing gel polymer, which may be a value obtained by subtracting the weight of the dried polymer from the weight of the water-containing gel polymer. Specifically, the water content may be defined as a value calculated by measuring the weight loss due to evaporation of moisture in the polymer during the process of drying by raising the temperature of the polymer through infrared heating. At this time, the drying conditions may be determined as follows: the drying temperature is increased from room temperature to about 180° C. and then the temperature is maintained at 180° C., and the total drying time is set to 20 minutes, including 5 minutes for the temperature rising step.

(Step 2)

The step 2 of the present technology is a step of gel-pulverizing the water-containing gel polymer prepared in the previous step 1.

Through the pulverizing, the size of the water-containing gel may be reduced and the surface area thereof may be increased, thereby increasing efficiency of the subsequent drying. In particular, as described above, the gel pulverizing conditions may be controlled to meet the chopping index, and thus the water-containing gel polymer may be very uniformly pulverized, thereby minimizing the surface damage of the superabsorbent polymer during a pneumatic conveying process. The 'pneumatic conveying process' refers to a process in which a product in each step after the step 2 or a superabsorbent polymer finally prepared is transferred through a conveying line using a high-pressure gas.

Meanwhile, during the gel pulverization of the water-containing gel polymer, a shear force and a compressive force are applied to the water-containing gel polymer. The present technology is characterized in that the shear force and the compressive force are controlled within a proper range by controlling gel pulverization conditions. The shear force is associated with the force acting when the water-containing gel polymer is extruded into a pulverizer, and the compressive force is associated with the force acting when the water-containing gel polymer is passed through the pulverizer.

Specifically, the step of gel-pulverizing the water-containing gel polymer may be carried out by extruding the water-containing gel polymer through a perforated panel having a plurality of holes using a screw extruder mounted inside a cylindrical pulverizer under the condition that a chopping index according to Equation 1 is 55 to 75.

The chopping index may be calculated according to the above-described Equation 1, and a detailed calculation method thereof will be described in Example below. More preferably, the chopping index is 56 or more, 57 or more, 58 or more, 59 or more, or 60 or more, and 74 or less, 73 or less, 72 or less, 71 or less, or 70 or less.

When the above-described gel pulverizing process is carried out, crumb-shaped water-containing gel polymer particles may be formed. When subsequent drying, pulverizing, and size-sorting processes may be carried out, a base polymer powder, into which a very developed porous structure is uniformly introduced, may be obtained.

After the gel pulverizing, the water-containing gel polymer particles formed in the form of crumbs may have a particle diameter of 0.1 mm to 10 mm. In other words, to increase the drying efficiency, the water-containing gel polymer is preferably pulverized into particles of 10 mm or less. However, since excessive pulverization may cause aggregation between particles, the water-containing gel polymer is preferably pulverized into particles of 0.1 mm or more.

In addition, since the pulverization of the water-containing gel polymer is carried out at a high water content, a phenomenon in which the water-containing gel polymer sticks to the surface of the pulverizer may occur. In order to minimize this phenomenon, steam, water, a surfactant, an anti-agglomerating agent (e.g., clay, silica, etc.); a persulfate-based initiator, an azo-based initiator, hydrogen peroxide, a thermal polymerization initiator, an epoxy-based crosslinking agent, a diol-based crosslinking agent, a crosslinking agent including multifunctional acrylate such as difunctional or trifunctional acrylate, or a mono-functional crosslinking agent including a hydroxyl group may be added to the water-containing gel polymer, as needed.

(Step 3)

The step 3 of the present technology is a step of drying, pulverizing, and size-sorting the gel-pulverized water-containing gel polymer of the step 2 to form a base polymer powder.

The drying may be carried out at a temperature of 120° C. to 250° C., or 140° C. to 200° C., or 150° C. to 190° C. In this regard, the drying temperature may be defined as a temperature of a heating medium provided for drying, or an internal temperature of a drying reactor including the heating medium and the polymer during the drying process. If the drying temperature is low, and therefore, the drying time becomes long, the process efficiency may be decreased. In order to prevent this problem, the drying temperature is preferably 120° C. or higher. In addition, when the drying temperature is higher than necessary, the surface of the water-containing gel polymer is excessively dried, and thus there is a concern about generation of fine particles during the subsequent pulverization process and deterioration of the physical properties of a final polymer. In order to prevent this problem, therefore, the drying temperature is preferably 250° C. or lower.

In this regard, the drying time in the drying step is not particularly limited, but may be controlled to 20 minutes to 90 minutes at the above drying temperature, in view of process efficiency and physical properties of the polymer.

The drying may be carried out by using a general medium, and for example, the pulverized water-containing gel polymer may be supplied with hot air, or irradiated with infrared rays, microwaves, ultraviolet rays, or the like.

The drying as above is performed such that the dried polymer may preferably have the water content of about 0.1% by weight to about 10% by weight. In other words, if the water content of the dried polymer is less than 0.1% by weight, production costs may be increased and degradation of the crosslinked polymer may undesirably occur due to excessive drying. If the water content of the dried polymer is more than 10% by weight, defects may occur in the subsequent process, which is not preferred.

Subsequently, the dried water-containing gel polymer may be pulverized. This is a step of optimizing the surface area of the base polymer powder and the superabsorbent polymer. The pulverization may be carried out such that the particle size of the pulverized polymer is 150 μm to 850 μm.

A pulverizer applicable herein may include a pin mill, a hammer mill, a screw mill, a roll mill, a disc mill, a jog mill, or the like which is commonly used.

In order to manage physical properties of the superabsorbent polymer finally produced, a step of selectively size-sorting particles having a particle size of 150 μm to 850 μm from the polymer particles obtained through the pulverization step may be further carried out.

The base polymer powder may be obtained through the above-described size-sorting process. The base polymer powder thus obtained may have a particle size of 150 μm to 850 μm, and may include fine powder having a particle size of less than 150 μm in an amount of 2% by weight or less, or 1% by weight or less.

More specifically, the base polymer powder includes particles having a particle size of 300 μm to 600 μm in an amount of 60% by weight or more, and when the surface of the entire base polymer powder having a particle size of 300 μm to 600 μm is observed through an electron micrograph, the porous particles may be included in a ratio of 60% by number or more, or 60% by number to 80% by number, or 60% by number to 70% by number, based on the total base polymer powder. In this regard, the term "porous particle"

refers to a particle in which a recess of 10 μm or more in depth occupies ⅓ of the surface of the particle, or a particle in which three or more recesses or pores of 10 μm or more in depth from the surface are observed on the surface.

The porous structure of the base polymer powder and the high ratio of porous particles may be maintained even in a superabsorbent polymer finally prepared, which may be confirmed by surface analysis and observation with an electron microscope.

(Step 4)

The step 4 of the present technology is a step of carrying out a surface crosslinking of the base polymer powder prepared in the step 3 by heat treatment in the presence of a surface crosslinking agent.

Through this surface crosslinking step, an additional surface crosslinked layer may be formed on the base polymer powder. Such a surface crosslinking step may be carried out under general surface crosslinking conditions of superabsorbent polymers, for example, carried out by a method of mixing and crosslinking the base polymer powder with a solution containing a surface crosslinking agent.

Here, as the surface crosslinking agent, alkylene carbonate having 2 to 5 carbon atoms which is a compound reactable with a functional group of the base polymer powder may be preferably used. More preferably, ethylene carbonate may be used as the surface crosslinking agent. Further, together with the surface crosslinking agent, porous silica, clay, etc. may be further used. Further, in order to adjust the penetration speed and depth of the surface crosslinking agent, an acidic compound or a polymer may be further added, as needed.

In this regard, the content of the surface crosslinking agent may be appropriately adjusted according to the kind or reaction conditions of the crosslinking agent, and preferably, adjusted to 0.001 part by weight to 5 parts by weight, or 0.01 part by weight to 4 parts by weight, or 0.1 part by weight to 3 part by weight, based on 100 parts by weight of the base polymer powder. If the content of the surface crosslinking agent is excessively low, surface modification may not properly occur, thereby reducing permeability or gel strength of a final polymer. On the contrary, when an excessively large amount of the surface crosslinking agent is used, absorption performances of the polymer may be rather deteriorated due to excessive surface crosslinking reaction, which is not preferred.

Meanwhile, the surface crosslinking step may be carried out by a common method such as a method of adding and mixing the surface crosslinking agent and the base polymer powder in a reactor, a method of spraying the surface crosslinking agent onto the base polymer powder, or a method of continuously feeding the base polymer powder and the surface crosslinking agent to a mixer which is continuously operated.

Further, when the surface crosslinking agent is added, water may be further added. As described, the surface crosslinking agent is added together with water, thereby inducing uniform dispersion of the surface crosslinking agent, preventing agglomeration of polymer particles, and further optimizing the penetration depth of the surface crosslinking agent into the polymer particles. In view of these purpose and effects, a content of water added together with the surface crosslinking agent may be adjusted to 0.5 parts by weight to 10 parts by weight with respect to 100 parts by weight of the base polymer powder.

Further, the surface crosslinking step may be carried out at a temperature of 100° C. to 250° C. Further, the surface modification may be carried out for 1 minute to 120 minutes, preferably 1 minute to 100 minutes, or more preferably 10 minutes to 80 minutes. In other words, in order to prevent the polymer particles from being damaged and physical properties thereof from being deteriorated upon excessive reaction while inducing a minimum surface crosslinking reaction, the surface crosslinking step may be performed under the above-described conditions.

(Superabsorbent Polymer)

Further, the present technology provides a superabsorbent polymer prepared according to the above-described preparation method of the present technology.

The superabsorbent polymer includes the base polymer powder including the crosslinked polymer of the water-soluble ethylene-based unsaturated monomer having acidic groups which are at least partially neutralized; and the surface crosslinked layer which is formed on the base polymer powder and is prepared by further crosslinking the crosslinked polymer via the surface crosslinking agent. Further, the superabsorbent polymer may be obtained as particles having a particle size of 150 μm to 850 μm.

The superabsorbent polymer prepared according to the above-described preparation method of the present technology may maintain excellent absorption performances by minimizing a surface damage phenomenon of the superabsorbent polymer during a pneumatic conveying process by meeting the above-described gel pulverization conditions.

In particular, the degree of surface damage on the superabsorbent polymer in the pneumatic conveying process during the preparation process of the superabsorbent polymer may be determined by calculating a crush resistance index. The 'crush resistance index' may be calculated as a difference in sphericity before and after crushing, after crushing the superabsorbent polymer according to the following crushing method, and a detailed method thereof will be described in Example below. Preferably, the crush resistance index of the superabsorbent polymer is −0.3 to 0.

As confirmed in Examples and Comparative Examples described below, when the above-described chopping index according to the present technology was applied, the crush resistance index was high and physical properties of the superabsorbent polymer were improved. In contrast, when the above-described chopping index according to the present technology was not applied, physical properties of the superabsorbent polymer were deteriorated or the crush resistance index was low.

Further, the high crush resistance index means that physical properties of the superabsorbent polymer are not deteriorated when the superabsorbent polymer is transported through a pneumatic conveying line.

In addition, the superabsorbent polymer according to the present technology is excellent in terms of CRC, AUP, vortex, and permeability.

As used herein, the term "CRC" is also called centrifugal retention capacity, and refers to an amount of a solution that may be absorbed under no load. CRC may be measured according to EDANA WSP 241.3, and a detailed measurement method will be described in Example below. Preferably, CRC of the superabsorbent polymer is 27 g/g to 40 g/g. More preferably, CRC of the superabsorbent polymer is 27.5 or more, or 28.0 or more, and 35 g/g or less.

As used herein, the term "AUP" is also called absorbency under pressure, and refers to an amount of a solution that may be absorbed under a predetermined load. AUP may be measured according to EDANA WSP 242.3, and a detailed measurement method will be described in Example below.

Preferably, AUP of the superabsorbent polymer is 24 g/g to 30 g/g. More preferably, AUP of the superabsorbent polymer is 24.5 g/g or more.

As used herein, the term "vortex" is also called absorption rate, and refers to a rate at which a solution is absorbed into a superabsorbent polymer. A detailed method of measuring the vortex will be described in Example below. Preferably, the vortex of the superabsorbent polymer is 45 seconds or less. More preferably, the vortex of the superabsorbent polymer is 44 seconds or less, 43 seconds or less, 42 seconds or less, 41 seconds or less, or 40 seconds or less. Meanwhile, the vortex is considered as excellent, when the value is small. Thus, a lower limit thereof is theoretically 0 second, but the vortex of the superabsorbent polymer is, for example, 20 seconds or more, 25 seconds or more, or 30 seconds or more.

As used herein, the term "permeability" refers to an ability to rapidly transfer a solution absorbed in a superabsorbent polymer to another superabsorbent polymer, in other words, it refers to a mobility of the solution within the superabsorbent polymer. Meanwhile, a detailed method of measuring the permeability will be described in Example below. Preferably, the permeability of the superabsorbent polymer is 65 seconds or less. More preferably, the permeability of the superabsorbent polymer is 60 seconds or less, 55 seconds or less, 50 seconds or less, 45 seconds or less, or 40 seconds or less. Meanwhile, the permeability is considered as excellent, when the value is small. Thus, a lower limit thereof is theoretically 0 second, but the permeability of the superabsorbent polymer is, for example, 20 seconds or more, 25 seconds or more, or 30 seconds or more.

Effect of the Invention

A method of preparing a superabsorbent polymer according to the present technology enables preparation of the superabsorbent polymer exhibiting an improved absorption rate while maintaining excellent absorption performances by minimizing a surface damage phenomenon of the superabsorbent polymer in a pneumatic conveying process during the preparation process of the superabsorbent polymer or in a pneumatic conveying process of the finally prepared superabsorbent polymer.

BRIEF DESCRIPTION OF DRAWINGS

FIG. 1 shows a schematic illustration of an apparatus for measuring a crush resistance index in Examples of the present technology.

DETAILED DESCRIPTION OF THE EMBODIMENTS

Hereinafter, preferred exemplary embodiments are provided for better understanding of the present invention. However, the following exemplary embodiments are only for illustrating the present invention, and the present invention is not limited thereto.

Respective physical properties in the following Examples and Comparative Examples were measured by the following methods.

(1) Centrifugal Retention Capacity (CRC)

Measurement was performed in accordance with EDANA WSP 241.3. In detail, the superabsorbent polymer $W_0$ (g, about 2.0 g) was uniformly placed into a nonwoven-fabric-made bag, followed by sealing. Then, the bag was immersed at room temperature in a physiological saline solution (0.9% by weight). After 30 minutes, the bag was drained at 250 G for 3 minutes with a centrifuge, and the weight $W_2$ (g) of the bag was then measured. Further, the same procedure was carried out without the superabsorbent polymer, and the resultant weight $W_1$ (g) was measured. From these weights thus obtained, CRC (g/g) was calculated according to the following Equation.

$$CRC(g/g) = \{[W_2(g) - W_1(g)]/W_0(g)\} - 1 \quad \text{[Equation 2]}$$

(2) Absorbency Under Pressure (AUP)

Absorbency under pressure (AUP) under 0.7 psi (or 0.18 psi) was measured for the superabsorbent polymers in accordance with EDANA WSP 242.3.

In detail, a 400 mesh stainless steel net was installed in the bottom of a plastic cylinder having an internal diameter of 25 mm. The superabsorbent polymer $W_0$ (g) was uniformly scattered on the stainless steel net under conditions of room temperature and relative humidity of 50%. A piston which may uniformly provide a load of 0.7 psi (or 0.18 psi) was put thereon, in which an external diameter of the piston was slightly smaller than 25 mm, there was no gab between the internal wall of the cylinder and the piston, and the jig-jog of the cylinder was not interrupted. At this time, the weight $W_3$ (g) of the apparatus was measured.

After putting a glass filter having a diameter of 90 mm and a thickness of 5 mm in a petri dish having a diameter of 150 mm, a physiological saline solution composed of 0.9% by weight of sodium chloride was poured until the surface level of the physiological saline solution became equal to the upper surface of the glass filter. A sheet of filter paper having a diameter of 90 mm was put on the glass filter. The measurement apparatus was mounted on the filter paper, thereby getting the liquid absorbed under the load for 1 hour. 1 hour later, the weight $W_4$ (g) was measured after lifting the measurement apparatus up.

Absorbency under pressure (g/g) was calculated from the obtained weights according to the following Equation.

$$AUP(g/g) = [W_{4(g)} - W_3(g)]/W_0(g) \quad \text{[Equation 3]}$$

The absorption rate was measured in seconds according to the method described in International Publication WO 1987-003208.

In detail, 2 g of the superabsorbent polymer was added to 50 mL of physiological saline at 23° C. to 24° C., and stirred with a magnetic bar (diameter of 8 mm and length of 31.8 mm) at 600 rpm, and a time taken for vortex to disappear was measured in seconds.

(4) Permeability

Permeability was measured according to the following Equation.

$$\text{Perm} = [20\ \text{mL}/T1\ (\text{sec})] * 60\ \text{sec} \quad \text{[Equation 4]}$$

in Equation 4,

Perm represents permeability of the superabsorbent polymer,

T1 represents a time (sec) taken for 20 mL of a physiological saline solution (0.9% by weight of aqueous sodium chloride solution) to pass through the swollen superabsorbent polymer under a pressure of 0.3 psi, after placing 0.2 g of the superabsorbent polymer in a cylinder, and pouring the physiological saline solution whereby the superabsorbent polymer was completely submerged therein to allow the superabsorbent polymer to swell for 30 minutes.

In detail, a cylinder and a piston were prepared. With regard to the cylinder, an inner diameter thereof was 20 mm and a glass filter and a stopcock were provided at the bottom thereof. With regard to the piston, a screen having an outer diameter of slightly smaller than 20 mm to freely move up and down in the cylinder was disposed at the bottom thereof, a weight was disposed at the top thereof, and the screen and the weight were connected by a rod. The piston was equipped with a weight capable of applying a pressure of 0.3 psi due to the addition of the piston.

0.2 g of the superabsorbent polymer was put while the stopcock of the cylinder was locked, and an excess of a physiological saline solution (0.9% by weight of aqueous sodium chloride solution) was poured so that the superabsorbent polymer was completely submerged. Then, the superabsorbent polymer was allowed to swell for 30 minutes. Thereafter, a piston was applied so that a load of 0.3 psi could be uniformly applied on the swollen superabsorbent polymer.

Subsequently, the stopcock of the cylinder was opened and a time taken for 20 mL of the physiological saline solution to pass through the swollen superabsorbent polymer was measured in seconds. At this time, the meniscus was marked when the cylinder was filled with 40 mL of the physiological saline solution, and the meniscus was marked when the cylinder was filled with 20 mL of the physiological saline solution, and thus a time taken to reach from the level corresponding to 40 mL to the level corresponding to 20 mL was measured to determine T1 of Equation 4.

(5) Crushing Method and Crush Resistance Index 0.5 kg to 1 kg of the superabsorbent polymer with a diameter of 600 μm to 710 μm was transferred through a pneumatic conveying line (diameter: 1 inch, length: 30 m, 90 degree bending line 2ea) in a pneumatic conveying system (PCS) having a structure of FIG. 1 at a pneumatic velocity of 15 m/s to 20 m/s, and then re-classified using a classifier to recover superabsorbent polymers having a diameter of 600 μm to 710 μm.

Sphericity of the recovered superabsorbent polymers was measured using Malvern Morphology 4 equipment (Malvern Panalytical), and calculated according to the following Equation.

$$\text{Crush resistance index} = ((\text{Sphericity after crushing}) - (\text{Sphericity before crushing})) \times 100 \quad \text{[Equation 5]}$$

Example 1

As a device for preparing a superabsorbent polymer, a continuous preparation system consisting of a polymerization process, a water-containing gel pulverizing process, a drying process, a pulverizing process, a size-sorting process, a surface crosslinking process, a cooling process, a size-sorting process, and a transport process connecting respective processes was used.

(Step 1)

100 parts by weight of acrylic acid was mixed with 0.6 parts by weight of polyethylene glycol diacrylate (weight average molecular weight: ~500 g/mol) as an internal cross-linking agent and 0.01 part by weight of IRGACURE 819 as a photo-polymerization initiator to prepare a monomer solution. Subsequently, while continuously feeding the monomer solution by a metering pump, 140 parts by weight of a 31 wt % aqueous sodium hydroxide solution was continuously subjected to line mixing to prepare an aqueous monomer solution. At this time, after confirming that the temperature of the aqueous monomer solution raised to about 72° C. or higher by neutralization heat, the solution was left until it was cooled to 40° C. When the temperature was cooled to 40° C., solid-phase sodium bicarbonate as a foaming agent was added in an amount shown in Table 1 below, and simultaneously, 6 parts by weight of a 2 wt % aqueous sodium persulfate solution was added. The solution was poured into a tray in the form of Vat (width 15 cm×length 15 cm) installed in a square polymerization reactor on which a light irradiation device was mounted, and of which inside was preheated to 80° C., and light irradiation was conducted to photo-initiate. It was confirmed that gel was formed from the surface about 15 seconds after light irradiation, and that a polymerization reaction occurred simultaneously with foaming at about 30 seconds, and then, it was additionally reacted for 3 minutes to obtain a water-containing gel polymer in the form of a sheet.

(Step 2)

The water-containing gel polymer in the form of a sheet obtained in the step 1 was confirmed to have a temperature of 70° C. to 90° C. 200 ml of water at room temperature was sprayed onto the water-containing gel polymer. The water-containing gel polymer was cut into a size of 3 cm×3 cm, and then chopped under chopping index conditions as in Table 1 below while pushing the water-containing gel polymer into a perforated panel having a plurality of holes using a screw extruder equipped inside of a cylindrical pulverizing device.

(Step 3)

Then, the water-containing gel polymer chopped in the step 2 was dried in a dryer capable of transferring air volume up and down. Hot air at 180° C. was allowed to flow from the lower side to the upper side for 15 minutes, and to flow from the upper side to the lower side again for 15 minutes, thus uniformly drying the water-containing gel polymer so that the water content of the dried powder was about 2% or less.

(Step 4)

Subsequently, the polymer dried in the step 3 was pulverized with a pulverizer and then size-sorted to obtain a base polymer powder with a size of 150 μm to 850 μm.

(Step 5)

Then, 6 g of the aqueous surface crosslinking solution containing 3 parts by weight of ethylene carbonate was sprayed onto 100 parts by weight of the prepared base polymer powder, and stirred at room temperature to mix them so that the surface crosslinking solution was uniformly distributed on the base polymer powder. Subsequently, the base polymer powder mixed with the surface crosslinking solution was put in a surface crosslinking reactor to perform a surface crosslinking reaction.

In this surface crosslinking reactor, the base polymer powder was confirmed to be gradually heated from the initial temperature around 80° C., and was operated to reach a maximum reaction temperature of 190° C. after 30 minutes. After reaching the maximum reaction temperature, the reaction was further allowed for 15 minutes, and a sample of the superabsorbent polymer finally prepared was taken. After the surface crosslinking process, classifying was performed with a standard mesh sieve of ASTM standard to prepare a superabsorbent polymer having a particle size of 150 μm to 850 μm.

Examples 2 to 4 and Comparative Examples 1 to 5

Each superabsorbent polymer was prepared in the same manner as in Example 1, except that the amount of the foaming agent and chopping index were changed as in Table 1 below.

Experimental Example

Physical properties of the superabsorbent polymers prepared in Examples and Comparative Examples were measured and shown in Tables 1 and 2 below. In Tables 1 and 2, and N, A, and R represent variables of the above-described Equation 1, respectively.

TABLE 1

| | | (Unit) | Ex. 1 | Ex. 2 | Ex. 3 | Ex. 4 |
|---|---|---|---|---|---|---|
| Preparation conditions | Foaming agent | (ppm) | 1500 | 1000 | 500 | 1000 |
| | Chopping index | | 63 | 63 | 63 | 72 |
| | N | rpm | 208 | 208 | 208 | 208 |
| | A | — | 0.38 | 0.38 | 0.38 | 0.37 |
| | R | mm | 10 | 10 | 10 | 9 |
| Physical properties of base resin | CRC | (g/gSAP) | 33.2 | 33.8 | 34.2 | 32.5 |
| | Vortex | (sec) | 46 | 50 | 53 | 44 |
| Crush resistance (#600-710 um) | Sphericity (before crushing) | — | 0.70 | 0.70 | 0.70 | 0.70 |
| | Sphericity (after crushing) | — | 0.69 | 0.7 | 0.69 | 0.68 |
| | Crush resistance index | | −1.0 | 0.0 | −1.0 | −2.0 |
| Physical properties of superabsorbent | CRC | (g/gSAP) | 28.5 | 28.9 | 29.1 | 28.3 |
| | AUP | (g/gSAP) | 24.9 | 25.1 | 25.1 | 24.7 |
| polymer before crushing | CRC + AUP (1) | | 53.4 | 54 | 54.2 | 53 |
| | Vortex | (sec) | 32 | 37 | 40 | 37 |
| | Permeability | (sec) | 35 | 36 | 44 | 60 |
| Physical properties of superabsorbent | CRC | (g/gSAP) | 28.2 | 29 | 28.9 | 28.2 |
| | AUP | (g/gSAP) | 25 | 24.9 | 25.2 | 24.7 |
| polymer after crushing | CRC + AUP (2) | | 53.2 | 53.9 | 54.1 | 52.9 |
| | Vortex | (sec) | 33 | 37 | 40 | 37 |
| | Permeability | (sec) | 37 | 39 | 45 | 62 |
| Deterioration of physical properties | Δ(1) − (2) | | −0.2 | −0.1 | −0.1 | −0.1 |

TABLE 2

| | | (Unit) | Comparative Ex. 1 | Comparative Ex. 2 | Comparative Ex. 3 | Comparative Ex. 4 | Comparative Ex. 5 |
|---|---|---|---|---|---|---|---|
| Preparation conditions | Foaming agent | (ppm) | 1000 | 500 | 0 | 1000 | 1000 |
| | Chopping index | | 45 | 45 | 63 | 53 | 83 |
| | N | rpm | 208 | 208 | 208 | 208 | 208 |
| | A | — | 0.38 | 0.38 | 0.38 | 0.38 | 0.36 |
| | R | mm | 14 | 14 | 10 | 12 | 8 |
| Physical properties of base resin | CRC | (g/gSAP) | 35.5 | 36 | 37.5 | 35 | 31 |
| | Vortex | (sec) | 61 | 66 | 70 | 56 | 40 |
| Crush resistance (#600-710 um) | Sphericity (before crushing) | — | 0.70 | 0.71 | 0.72 | 0.70 | 0.70 |
| | Sphericity (after crushing) | — | 0.65 | 0.7 | 0.71 | 0.69 | 0.68 |
| | Crush resistance index | | −5.0 | −1.0 | −1.0 | −1.0 | −2.0 |
| Physical properties of superabsorbent | CRC | (g/gSAP) | 29.5 | 29.9 | 30 | 29.4 | 27 |
| | AUP | (g/gSAP) | 25.1 | 25.3 | 24.8 | 25 | 23.1 |
| polymer before crushing | CRC + AUP (1) | | 54.6 | 55.2 | 54.8 | 54.4 | 50.1 |
| | Vortex | (sec) | 41 | 52 | 63 | 42 | 35 |
| | Permeability | (sec) | 60 | 85 | 95 | 60 | 23 |

TABLE 2-continued

| | | (Unit) | Comparative Ex. 1 | Comparative Ex. 2 | Comparative Ex. 3 | Comparative Ex. 4 | Comparative Ex. 5 |
|---|---|---|---|---|---|---|---|
| Physical properties of superabsorbent | CRC | (g/gSAP) | 29.3 | 29.6 | 29.9 | 29.2 | 27.1 |
| | AUP | (g/gSAP) | 24.9 | 25.2 | 24.8 | 25.1 | 23.1 |
| polymer after crushing | CRC + AUP (2) | | 54.2 | 54.8 | 54.7 | 54.3 | 50.2 |
| | Vortex | (sec) | 42 | 51 | 64 | 44 | 34 |
| | Permeability | (sec) | 64 | 86 | 96 | 62 | 25 |
| Deterioration of physical properties | Δ(1) − (2) | | −0.4 | −0.4 | −0.1 | −0.1 | 0.1 |

As shown in Table 1, it was confirmed that when the superabsorbent polymers were prepared by the preparation method according to the present technology using the foaming agent and the chopping index in the range according to the present technology, the crush resistance index was high and CRC, AUP, vortex, and permeability were also excellent. It was also confirmed that due to the high crush resistance index, most of the superabsorbent polymers maintained the equivalent physical properties even after crushing.

However, as shown in Table 2, it was confirmed that Comparative Examples 1 and 2 showed low crush resistance index due to the chopping index lower than the range according to the present technology, and therefore, after crushing, the physical properties of the superabsorbent polymers were mostly deteriorated. Further, Comparative Example 3 showed deterioration in the absorption rate and permeability, although the crush resistance index was equivalent to that of Examples of the present technology. This is because gel pulverization was not uniformly performed to affect the physical properties of the superabsorbent polymer.

Further, Comparative Example 4 showed deterioration in the absorption rate and permeability, because no foaming agent was used and thus sufficient pores were not formed inside the superabsorbent polymer. Comparative Examples 5 and 6 showed deterioration in the absorption rate and permeability (Comparative Example 5), or deterioration in the absorption ability (CRC and AUP), although the crush resistance index was equivalent to that of Examples of the present technology, like in Comparative Example 3.

Accordingly, it was confirmed that when the preparation method according to the present technology is performed using the foaming agent and the chopping index in the range of the present technology, the crush resistance index is high and various physical properties of the superabsorbent polymer are improved at the same time.

The invention claimed is:

1. A method of preparing a superabsorbent polymer, the method comprising:

1) Carrying out a crosslinking polymerization of a monomer composition comprising a water-soluble ethylene-based unsaturated monomer having acidic groups which are at least partially neutralized, in the presence of a foaming agent, to form a water-containing gel polymer;

2) Gel-pulverizing the water-containing gel polymer;

3) Drying, pulverizing, and size-sorting the gel-pulverized water-containing gel polymer to form a base polymer powder; and 4) Carrying out a surface crosslinking of the base polymer powder by heat treatment in the presence of a surface crosslinking agent, wherein the foaming agent is present in an amount of 500 to 1,500 ppm in the monomer composition, and the gel-pulverizing is carried out by extruding the water-containing gel polymer through a perforated panel having a plurality of holes using a screw extruder mounted inside a cylindrical pulverizer under a condition that a chopping index according to Equation 1 is 60 to 75:

$$\text{Chopping index} = \frac{2\pi \times N}{60} \times \frac{1}{A} \times \frac{11}{R} \quad \text{[Equation 1]}$$

wherein in Equation 1,

N represents a number of rotation (rpm) of a screw in the screw extruder,

A represents porosity ($\pi r^2 \times n/\pi R^2$) of the perforated panel, wherein r represents a radius (mm) of the holes formed in the perforated panel, n represents a number of holes formed in the perforated panel, and R represents a radius (mm) of the perforated panel, wherein the superabsorbent polymer has a CRC of 27 g/g to 40 g/g as measured in accordance with EDANA WSP 241.3, a AUP of 24 g/g to 30 g/g as measured in accordance with EDANA WSP 242.3, a vortex of 40 seconds or less as measured by adding 2 g of the superabsorbent polymer to 50 mL of physiological saline at 23° C. to 24° C., and stirring with a magnetic bar (diameter of 8 mm and length of 31.8 mm) at 600 rpm, and a time taken for vortex to disappear being measured in seconds, and a permeability of 30 to 60 seconds measured according to Equation 4:

$$\text{Perm} = [20 \text{ mL}/T1 \text{ (sec)}] * 60 \text{ sec} \quad \text{[Equation 4]}$$

wherein in Equation 4,

Perm represents permeability of the superabsorbent polymer, T1 represents a time (sec) taken for 20 mL of a physiological saline solution (0.9% by weight of aqueous sodium chloride solution) to pass through the swollen superabsorbent polymer under a pressure of 0.3 psi, after placing 0.2 g of the superabsorbent polymer in a cylinder, and pouring the physiological saline solution whereby the superabsorbent polymer was completely submerged therein to allow the superabsorbent polymer to swell for 30 minutes.

2. The method of claim 1, wherein the foaming agent includes one or more of sodium bicarbonate, sodium carbonate, potassium bicarbonate, potassium carbonate, calcium bicarbonate, calcium carbonate, magnesium bicarbonate, magnesium carbonate, azodicarbonamide, dinitroso pentamethylene tetramine, p,p'-oxybis(benzenesulfonyl hydrazide), p-toluenesulfonyl hydrazide, sucrose stearate, sucrose palmitate, or sucrose laurate.

3. The method of claim 1, wherein the chopping index is 60 to 70.

4. The method of claim 1, wherein the superabsorbent polymer has a crush resistance index of −0.3 to 0 according to Equation 5:

$$\text{Crush resistance index} = ((\text{Sphericity after crushing}) - (\text{Sphericity before crushing})) \times 100, \quad \text{[Equation 5]}$$

wherein in Equation 5, the Sphericity after crushing is measured as follows:

transferring 0.5 kg to 1 kg of the superabsorbent polymer with a diameter of 600 μm to 710 μm through a pneumatic conveying line having a diameter of 1 inch, a length of 30 m, and a 90 degree bending line in a pneumatic conveying system at a pneumatic velocity of 15 m/s to 20 m/s, re-classifying using a classifier to recover superabsorbent polymers having a diameter of 600 μm to 710 μm, and measuring the Sphericity of the recovered superabsorbent polymer.

* * * * *